Aug. 10, 1926.

M. W. MORGAN 1,595,612

ROTARY SHAFT COUPLING

Filed May 10, 1924    2 Sheets-Sheet 1

Inventor
Merton W. Morgan

By John W. Darley
Attorney

Aug. 10, 1926.

M. W. MORGAN

ROTARY SHAFT COUPLING

Filed May 10, 1924   2 Sheets-Sheet 2

1,595,612

Inventor
Merton W. Morgan

By John W. Harley.
Attorney

Patented Aug. 10, 1926.

1,595,612

UNITED STATES PATENT OFFICE.

MERTON W. MORGAN, OF BALTIMORE, MARYLAND, ASSIGNOR TO POOLE ENGINEERING AND MACHINE COMPANY, OF BALTIMORE, MARYLAND, A CORPORATION OF MARYLAND.

ROTARY SHAFT COUPLING.

Application filed May 10, 1924. Serial No. 712,300.

My invention relates to a rotary shaft coupling.

Among the objects of my invention are:—

To provide a coupling so constructed and arranged that the outside members thereof may be used to align the shafts that are to be coupled.

To provide a coupling so constructed and arranged that the inside members thereof may be used to align the shafts that are to be coupled.

To provide a coupling capable of providing a positive driving relation between a pair of shafts while permitting freedom of rotation of said shafts even if they are structurally or otherwise misaligned axially.

To provide a coupling having a lubricated bearing coaxial with each of the coupled shafts.

To provide a coupling in which there is a member for each shaft comprising teeth having curved crowns and a sleeve having teeth engaging the teeth of said members, the surfaces being between adjacent teeth on said sleeve bearing on said crowns in order to form bearings for the ends of said sleeve and combining with said sleeve removable dust guards having contact with said members.

To provide a coupling so constructed and arranged as to provide for axial movement of each shaft independently of the other shaft.

These and further objects of my invention will become apparent in the following specification, reference being had to the accompanying drawings, and the novel means by which said objects are effectuated will be definitely pointed out in the claims.

In the drawings:—

Figure 1:
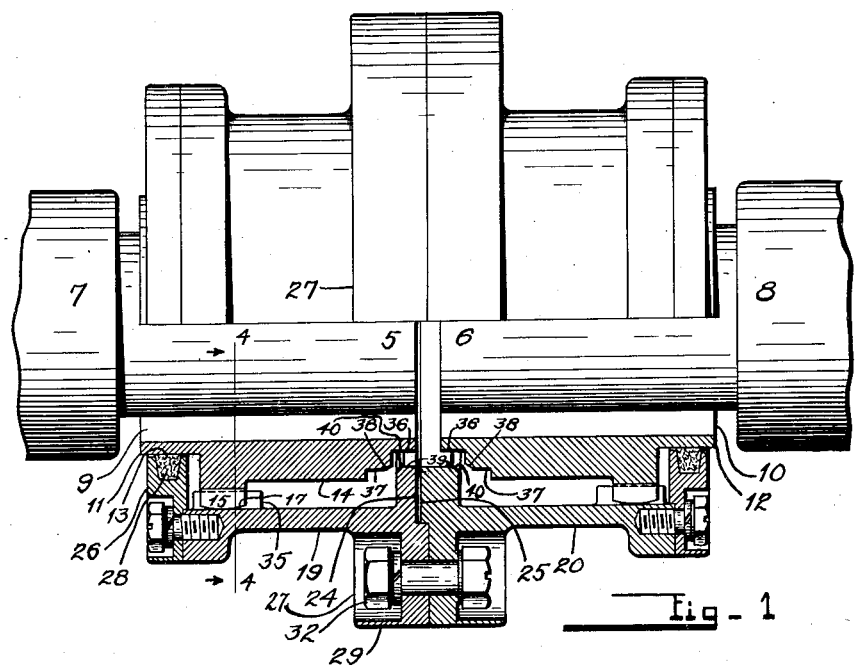
Figure 1 is a view partly in section of my improved coupling.

5 and 6 are the shafts that are coupled by my improved coupling. Either shaft may be the driver and it is revolubly mounted in bearings, one of which for each shaft is shown at 7 and 8, respectively.

Upon each shaft there is secured by the keys 9 and 10, respectively, the shaft members 11 and 12. The members 11 and 12 being similar the member 11 only will be described in detail.

The member 11 is provided with the cylindrical surfaces 13 and 14 and with the teeth 15. The teeth 15 have involute flanks and faces. Said flanks and faces may be of any curvature suitable for gear teeth, but in any case, the crowns of the teeth 15 are curved as shown at 17 for a purpose hereinafter explained.

The members 11 and 12 are coupled together by a sleeve formed of the sleeve members 19 and 20. The members 19 and 20 being similar excepting that the former has a counterbored recess 24 for the reception of the cylindrical projection 25 on the member 20, the member 19 only will be described in detail.

Figure 2:
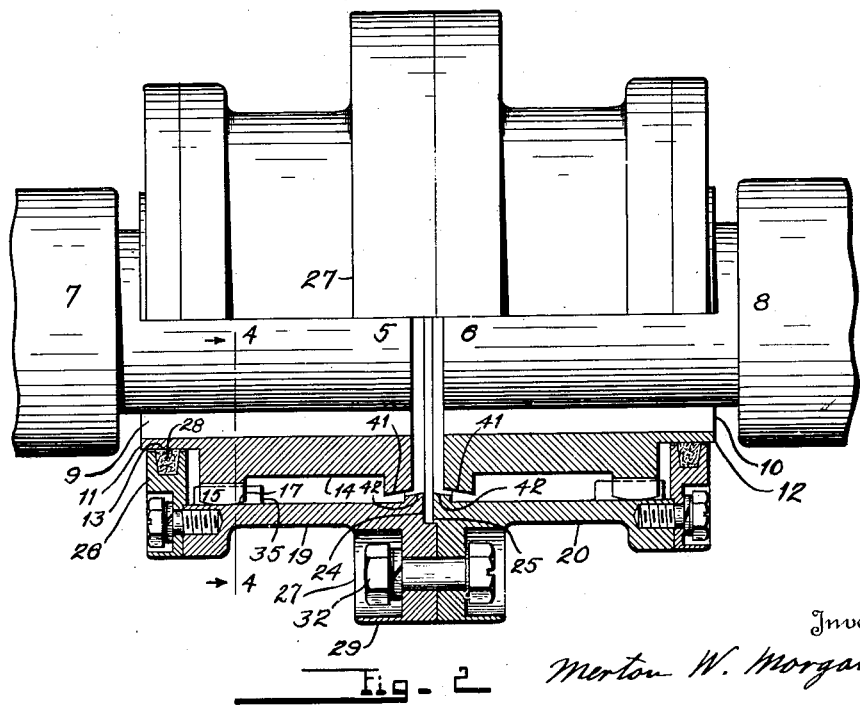
Fig. 2 is a view partly in section showing a variation in the construction of my improved coupling.

A flange 26 is provided in each of the structures shown in Figs. 1 and 2 which is secured to the member 19 by suitable bolts. In the structure shown in Fig. 3 the flange 26 is formed integrally with the member 19.

The flange 26 has an annular groove therein for the packing 28 and the latter forms a dust-tight joint with the surface 13 which is sufficiently smaller in diameter than the pitch diameter of the teeth 15 to insure that the latter will have a supply of oil without danger of its finding egress past the packing 28.

The member 19 has a flange 27 which is provided with a cylindrical surface 29. Teeth 35 are formed on the interior of the member 19 which mesh with the teeth 15; the surfaces between adjacent teeth 35 bear upon the surfaces 17 in order to provide a bearing for the end of the sleeve member 19.

The members 19 and 20 are secured together by bolts, one of which is shown at 32.

Figure 3:
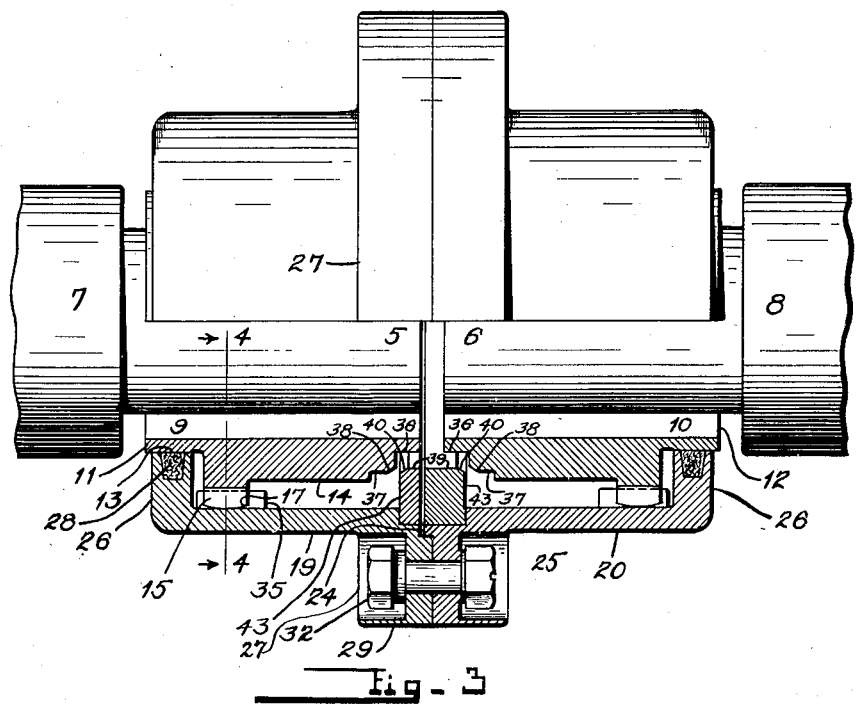
Fig. 3 is another variation in my improved coupling.

The above enumerated parts shown in Figs. 1, 2 and 3 are similar excepting that, as before stated, the flange 26 is made separable from the member 19 in the structures shown in Figs. 1 and 2 and is formed integrally with the member 19 in the structure shown in Fig. 3.

In the structures shown in Figs. 1 and 3 there are provided cylindrical surfaces 36 and 37 upon the members 11 and 12, the surfaces 37 terminating in the frustro-conical surfaces 38. The members 19 and 20 are provided with the cylindrical surfaces 39 which are of such size that they will fit snugly upon the surfaces 37 for a purpose hereinafter explained.

It is to be noted that the surfaces 39 in the structure shown in Fig. 1 are formed upon flanges that are made integral with the members 19 and 20 and that the surfaces 39 in the structure shown in Fig. 3 are formed upon removable rings 43 that are pressed into recesses formed in the members 19 and 20.

The surfaces 39 terminate in frustro-conical surfaces 40.

In the structure shown in Fig. 2 frustro-conical surfaces 41 are formed upon the members 11 and 12 and frustro-conical surfaces 42 are also formed upon the members 19 and 20.

The manner of assembling and the mode of operation of my improved coupling as shown in Fig. 1 is as follows:—

The sleeve member 19 with the flange 26 is placed upon the shaft member 11 by sliding it thereon from right to left and the flange 26 is then bolted in place. The sleeve member 20 and the corresponding flange are then assembled in place on the shaft member 12 in a similar manner. The shaft members 11 and 12 are then secured, or they may previously have been secured, upon the shafts 5 and 6, respectively, but in either case, the sleeve member 19 is placed with the surface 39 engaging the surface 37, the axial position of the member 19 being determined by the shoulder between the surfaces 14 and 37 contacting with the inner flange on the member 19. The sleeve member 20 is similarly placed with reference to the corresponding shaft member.

It is to be noted that the surface 39 is readily guided into engagement with the surface 37 by the guiding action of the frustro-conical surfaces 38 and 40. The shafts 5 and 6 are then adjusted until they are in axial alignment as will be evidenced by the conformity of the cylindrical surface 29 and the similar surface of the member 20 to a straight edge placed thereagainst; or by the conformity of the surfaces 36 to a straight edge placed thereagainst; or by the equality of entrances of a wedge when placed at different positions between the abutting surfaces of the members 19 and 20.

After the shafts are aligned, the members 19 and 20 are to be bolted together.

It is to be noted that by the provision of the cylindrical surfaces 36, which are of the same diameter, I provide ready means for aligning the shafts, even though there were very great looseness between the surfaces 37 and 39 so that a straight edge applied to the surface 29 and the similar surface on the member 20 would not serve to give a correct indication of the alignment of the shafts 5 and 6.

Figure 4:
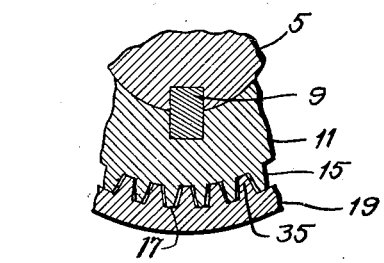
Fig. 4 is a section along the line 4—4 in Figs. 1, 2 and 3 looking in the direction of the arrows.

Should the shafts 5 and 6 be misaligned the members 19 and 20 having a rocking bearing on the surfaces 17 will allow sufficient angular freedom to prevent said shafts from binding in their bearings. Both of said members have sufficient play between the teeth 15 to permit of said movement. This play is shown greatly exaggerated in Fig. 4.

It is to be noted that by having the rocking bearings for the sleeve members upon the surfaces 17, I am enabled to build a coupling of minimum diameter for any given capacity; further, that but a small movement of the members 19 and 20 is required to bring the surfaces 39 upon the corresponding surfaces 37; consquently, the bearings 7 and 8 need not be far from the members 11 and 12.

It is to be noted that the members 19 and 20 when bolted together have sufficient movement axially to provide for all needful end play of the shafts 5 and 6.

The structure shown in Fig. 2 is to be assembled in the same manner as the structure shown in Fig. 1 excepting that when the shafts 5 and 6 are to be aligned, the frustro-conical surfaces 42 are placed into contact with the frustro-conical surfaces 41 and thus the surface 29 and the corresponding surface on the member 20 are rendered truly coaxial with the shafts 5 and 6, respectively.

This type of coupling can be aligned only by placing the straight edge on the surface 29 and the similar surface on the member 20.

In the structure shown in Fig. 3, the sleeve member 19 is placed upon the shaft member 11 by sliding it thereon from left to right and the ring 43 is then pressed within the recess within said member. The sleeve member 20 is similarly placed upon the shaft member 12 and the corresponding ring 43 put in place. Thereafter the shafts 5 and 6 can be assembled in the same manner as heretofore explained with reference to Fig. 4.

I have shown three forms of my invention for illustrative purposes, but it is to be understood that I do not desire my invention to be limited to the exact structures shown, for changes may be made therein without departing from the spirit of my invention.

I claim:—

1. In a coupling, the combination with a pair of shaft members for attachment to the shafts to be coupled, each member comprising teeth having curved crowns, of a pair of sleeve members secured together, each sleeve member having an outer cylindrical surface and teeth engaging the teeth of said shaft members, the surfaces between the teeth of said sleeve bearing on said crowns, a cylindrical surface on each shaft member, an inner cylindrical surface smaller in diameter than the diameter of said crowns on each sleeve member located to engage with the cylindrical surface on the corresponding shaft member when said sleeve members are separated and moved axially in order to coaxially align the outer cylindrical surface of each sleeve member with the corresponding shaft, and a removable flange secured to the ends of said sleeves.

2. In a coupling, the combination with a pair of shaft members for attachment to the shafts to be coupled, each member comprising teeth having curved crowns, of a pair of sleeve members secured together, each sleeve member having teeth engaging the teeth of said shaft members, the surfaces between the teeth on said sleeve bearing on said crowns, means for supporting said sleeve members on said shaft members when said sleeve members are separated and moved axially apart and cylindrical surfaces on said shaft members exposed when said sleeve members are moved axially apart to permit of the application of a straight edge to said last-named cylindrical surfaces for aligning the shafts.

3. In a coupling, the combination with a pair of shaft members for attachment to the shafts to be coupled, each member comprising teeth having curved crowns, of a pair of sleeve members secured together, each sleeve member having teeth engaging the teeth on said shaft members, the surfaces between the teeth of said sleeve bearing on said crowns, a cylindrical surface on each shaft member, a shoulder on each shaft member, an inner cylindrical surface on each sleeve member located to engage with the cylindrical surface on the corresponding shaft member, when said sleeve members are separated and moved axially, abutting annular surfaces on said sleeve members, and a shoulder on each sleeve member located to engage with the shoulder on the corresponding shaft member when said sleeve members are moved axially, whereby the axial movement of said sleeve members is limited so that a wedge may be introduced at different locations between said annular surfaces to indicate when said shafts are aligned.

4. In a coupling, the combination with a pair of shaft members for attachment to the shafts to be coupled, each member comprising teeth having curved crowns, of a pair of sleeve members secured together, each sleeve member having an outer cylindrical surface and teeth engaging the teeth of said shaft members, the surfaces between the teeth of said sleeve bearing on said crowns, a cylindrical surface on each shaft member and an inner cylindrical surface on each sleeve member located to engage with the cylindrical surface on the corresponding shaft member when said sleeve members are separated and moved axially in order to coaxially align the outer cylindrical surface of each sleeve member with the corresponding shaft.

In testimony whereof, I affix my signature.

MERTON W. MORGAN.